(12) United States Patent  
Mecherle et al.

(10) Patent No.: US 7,039,320 B1
(45) Date of Patent: May 2, 2006

(54) PORTABLE LASER TRANSCEIVER

(75) Inventors: George Stephen Mecherle, Hawthorne, CA (US); Terry Lee Holcomb, Torrance, CA (US)

(73) Assignee: Fsona Communications Corporation, Vancouver (CA)

( * ) Notice: Subject to any disclaimer, the term of this patent is extended or adjusted under 35 U.S.C. 154(b) by 0 days.

(21) Appl. No.: 09/434,913

(22) Filed: Nov. 5, 1999

(51) Int. Cl.
*H04B 10/00* (2006.01)

(52) U.S. Cl. .................... 398/128; 398/118; 398/130

(58) Field of Classification Search ............... 359/182, 359/154, 152, 172, 153, 159, 118–131
See application file for complete search history.

(56) References Cited

U.S. PATENT DOCUMENTS

| | | | | |
|---|---|---|---|---|
| 4,054,794 A | * | 10/1977 | Laughlin et al. | 348/484 |
| 4,149,071 A | * | 4/1979 | Nagai et al. | 359/153 |
| 5,307,194 A | * | 4/1994 | Hatton et al. | 250/504 R |
| 5,416,627 A | * | 5/1995 | Wilmoth | 359/152 |
| 5,448,077 A | * | 9/1995 | Krause | 250/551 |
| 5,610,750 A | * | 3/1997 | Popescu et al. | 359/152 |
| 5,777,768 A | | 7/1998 | Korevaar | 359/172 |
| 5,781,671 A | * | 7/1998 | Li et al. | 359/115 |
| 5,969,860 A | * | 10/1999 | Mearns | 359/353 |
| 6,381,054 B1 | * | 4/2002 | Okayasu et al. | 359/152 |

OTHER PUBLICATIONS

W.M. Bruno, R. Mangual, and R.F.Zampolin, Diode Laser Spatial Diversity Transmitter, pp.187-194, SPIE vol. 1044 Optomechanical Design of Laser Transmitters and Receivers (1989).

* cited by examiner

*Primary Examiner*—Agustin Bello
(74) *Attorney, Agent, or Firm*—Connolly Bove Lodge & Hutz LLP

(57) ABSTRACT

A portable transceiver of one or more signals includes an input, frequency modulation, a splitter and a plurality of lasers in a transmitter module. A receiver module includes a Mangin mirror aligned with an input aperture. A photodiode receives the signal from the mirror for subsequent demodulation. An interference filter is arranged between the mirror and the photodiode. The filter is hemispherical, having a center of curvature at the focal point of the mirror. The transceiver may include a video camera and gyro-stabilizer accessories. A visual siting scope is aligned with the lasers and the receiver. A separate transceiver for ethernet input signals interfaces with a 10/100 ethernet switch and does not employ frequency modulation.

31 Claims, 4 Drawing Sheets

PORTABLE LASER TRANSCEIVER

BACKGROUND OF THE INVENTION

The field of the present invention is transceivers using lasers as the communicating medium.

A phenomenon referred to as scintillation causes the random fading of signals transmitted through the atmosphere. It is understood that the atmosphere is not homogeneous in that the index of refraction of air is not constant due to wind or turbulence. The transmission of a beam of light through the atmosphere is subject to these variations in the index of refraction such that the beam may be momentarily deflected from a straight path. With such deflection, an observer of the beam perceives the source to be flickering. Such flickering is highly disruptive to data transmission. A solution may be found in the increase in size of the apertures of the sending and receiving units. The intensity of the source can to a certain extent mitigate losses in transmission where the sensitivity of the receiver is not correspondingly decreased. Often, physical and practical limitations detract from such solutions.

To significantly overcome the effect of scintillation, spacial diversity transmitters have been constructed which employ multiple diode lasers arranged to produce displaced parallel beams. As these beams diverge, they overlap one another. A receiver displaced from the transmitter thus receives uncorrelated light at the receiver when aligned with the beams. As it is unlikely that all beams will be simultaneously diverted, the receiver is able to receive uninterrupted data from at least some of the plurality of transmitters. It has been found that the normalized standard deviation of the intensity at the receiver is reduced by the square root of the number of transmitting elements when properly separated. Reference is made to W. M. Bruno, R. Mangual, & R. F. Zampolin, *Diode Laser Spacial Diversity Transmitter*, pp. 187–194, SPIE vol. 1044, Optomechanical Design of Laser Transmitters and Receivers (1989), the disclosure of which is incorporated herein by reference.

One structural application of the very principles presented in the foregoing publication are found in U.S. Pat. No. 5,777,768, the disclosure of which is also incorporated herein by reference. Laser transceivers using spaced multiple laser transmitters are used for two-way communication.

SUMMARY OF THE INVENTION

The present invention is directed to portable transceivers using laser light as the carrier. Transmitter and receiver modules are contemplated. Analog audio and video and digital ethernet communications are also encompassed by the inventions.

In a first separate aspect of the present invention, the portable transceiver includes an input, a frequency modulator, a splitter receiving signals from the frequency modulator and a plurality of lasers transmitting the frequency modulated signals of the splitter. Such frequency modulated signals may be employed for video and two channels of audio communications. The plurality of lasers may include a laser driver for conditioning laser data signals and laser diodes.

In a second separate aspect of the present invention, the portable transceiver includes a plurality of lasers displaced from one another and facing in parallel directions. The transceiver includes a photodiode, a fiber optic element sampling the laser diode output and extending to the photodiode and a modulation signal amplifier which is responsive to the output of that photodiode to provide a signal strength feedback loop.

In a third separate aspect of the present invention, the portable transceiver includes a frequency modulator driving a plurality of lasers through a splitter with a continuous sine wave having a 20 Megahertz bandwidth which is directed to each laser. Each laser diode generates an average power of 80 milliwatts. Four such laser diodes are contemplated in one embodiment.

In a fourth separate aspect of the present invention, the portable transceiver includes a frequency modulator coupled with a plurality of lasers through a splitter and having a visual sighting scope aligned with the lasers. Lenses receiving the laser outputs collimate the outputs into beams of less than 1° cone angle each, requiring reasonable accuracy in aiming of the portable units.

In a fifth separate aspect of the present invention, the portable transceiver includes an aperture, a Mangin mirror in line with the aperture, a photodiode at the focal point of the Mangin mirror and output from the photodiode. This arrangement with a Mangin mirror facilitates an f-number of about 0.67.

In a sixth separate aspect of the present invention, the portable transceiver of the fifth separate aspect further contemplates the employment of a hemispherical interference filter having a center of curvature at the focal point of the Mangin mirror. This interference filter may have a nominal center wavelength of 1,550 nanometers with a narrow bandwidth of 100 nanometers.

In a seventh separate aspect of the present invention, a portable transceiver of ethernet signals includes an input for receiving such signals, a splitter and a plurality of lasers facing in parallel directions. Again, a Mangin mirror may be employed with an aperture for receiving like signals. Further, a hemispherical interference filter having a center of curvature at the focal point of the Mangin mirror facilitates portability. An ethernet outlet receives the incoming signals from a photodiode located at the focal point of the Mangin mirror.

In an eighth separate aspect of the present invention, any of the foregoing aspects are contemplated in combination for additional advantage.

Accordingly, it is a principal object of the present invention to provide an improved transceiver using laser communications. Other and further objects and advantages will appear hereinafter.

DETAILED DESCRIPTION OF THE PREFERRED EMBODIMENT

Figure 1:
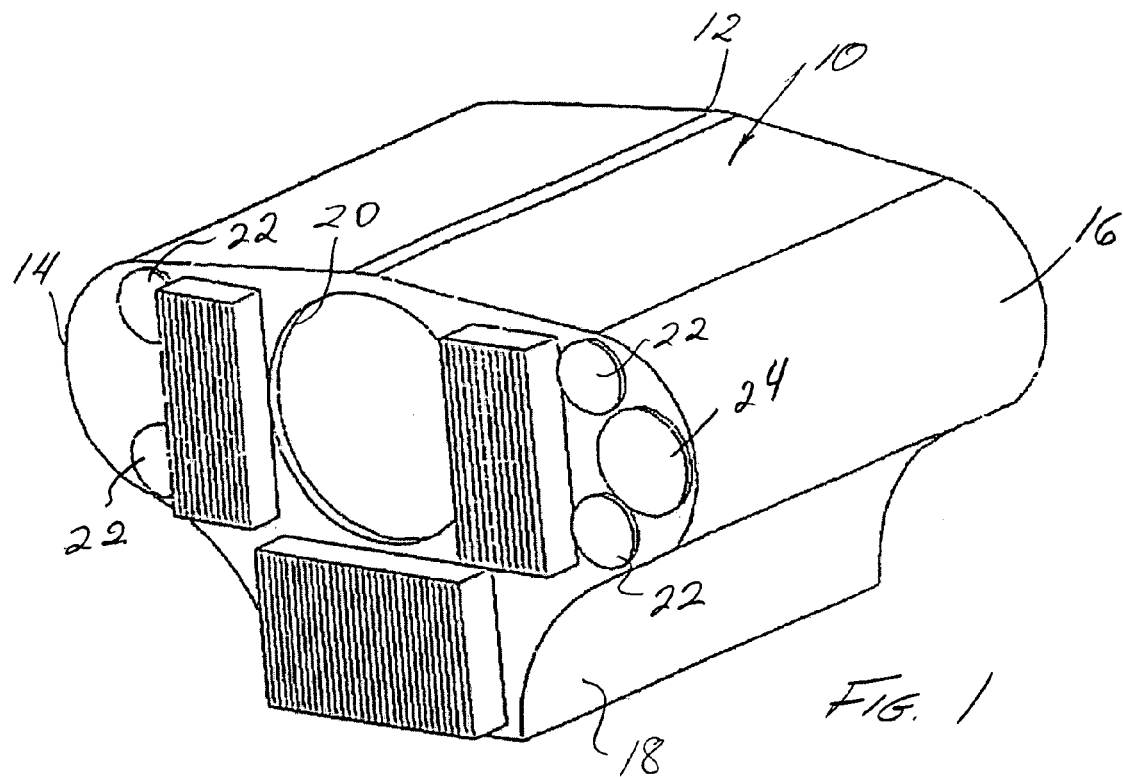
FIG. 1 is a front perspective view of a portable transceiver.
Figure 2:
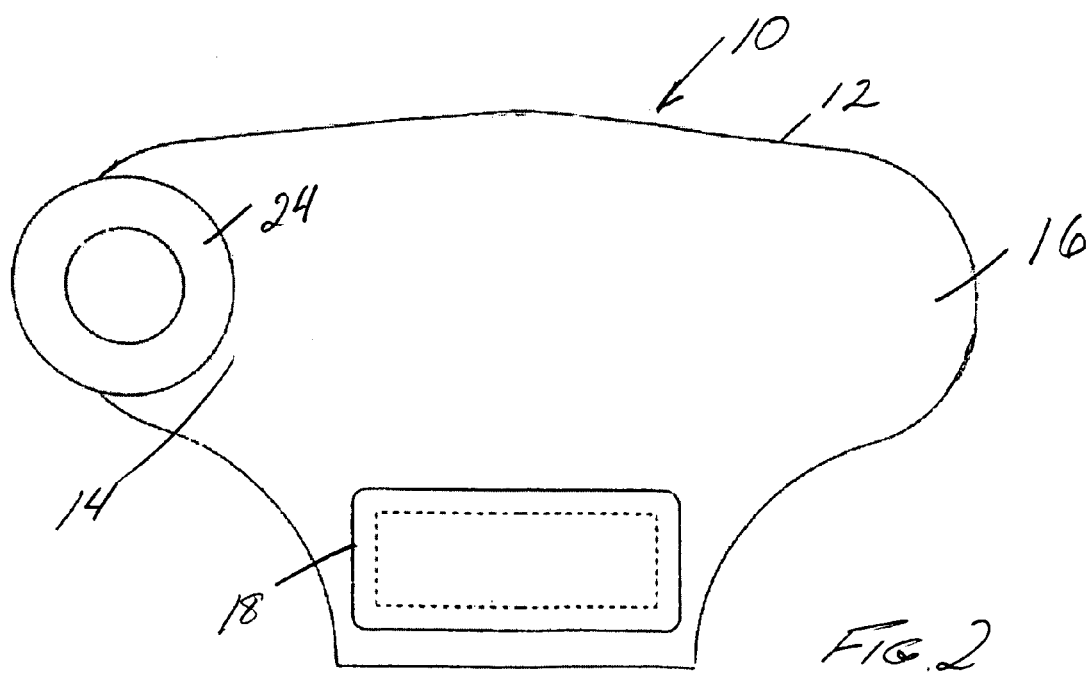
FIG. 2 is a back perspective view of the portable transceiver.

Turning in detail to the drawings, a portable transceiver 10 is illustrated as including a housing 12 having lateral lobes 14 and 16 such that the transceiver 10 may be manually held much as binoculars. A battery pack structure 18 depends centrally from the housing 12. It is also contemplated that the housing 12 may be modified such that a battery pack will be located outside of the housing and received by an accessory shoe much as a camera flash attachment. A receiving aperture 20 is located centrally in the front of the housing 12. Four laser apertures 22 are spaced about the receiving aperture 20. A visual sighting scope 24 extends fully through the housing 12 and is aligned with the lasers for aiming of the transceiver 10. The scope 24 may provide active or passive filters for enhancing detection of another transceiver with which communication is being established.

Figure 3:
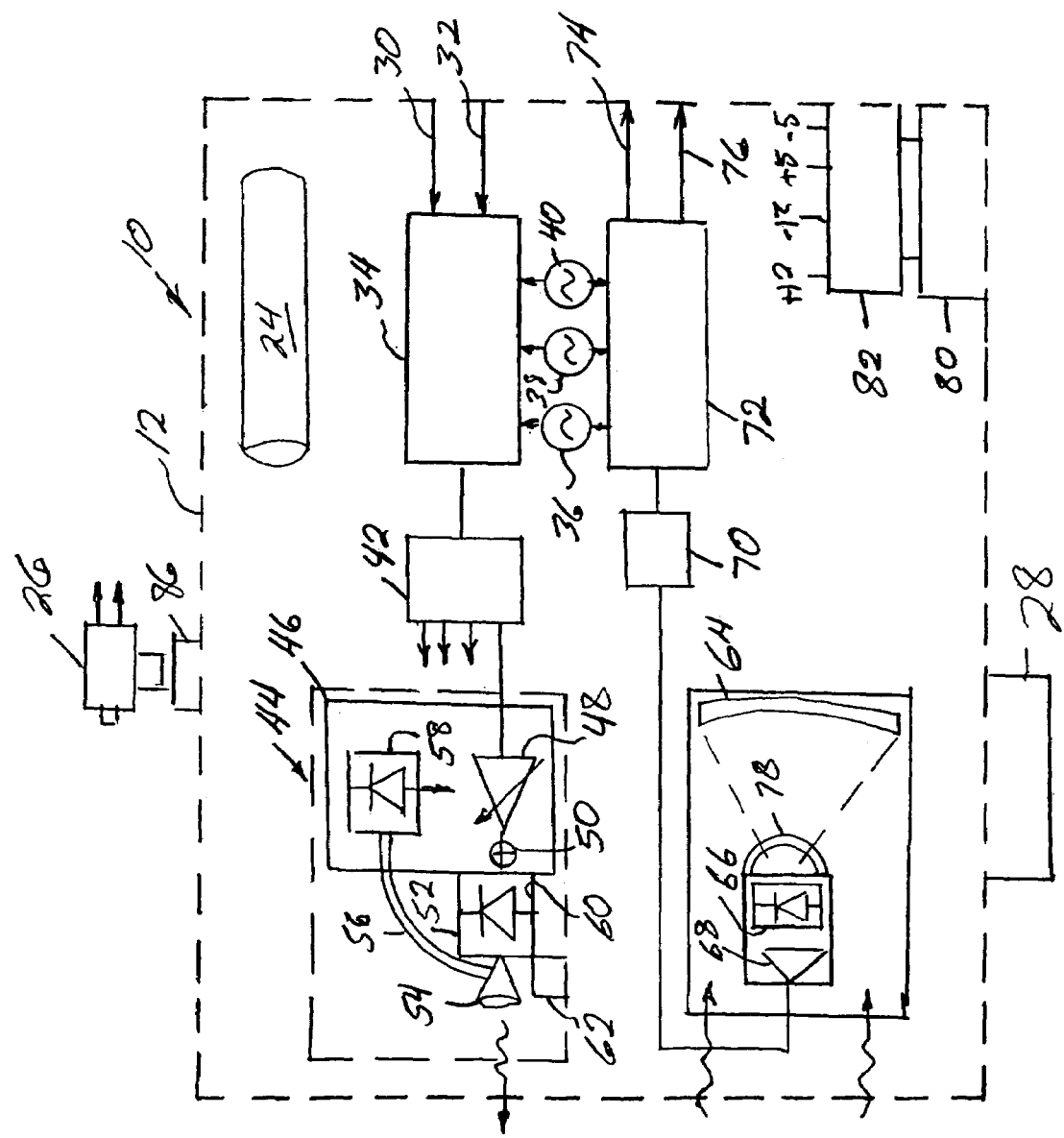
FIG. 3 is a schematic diagram of a portable transceiver using frequency modulation.
Figure 4:
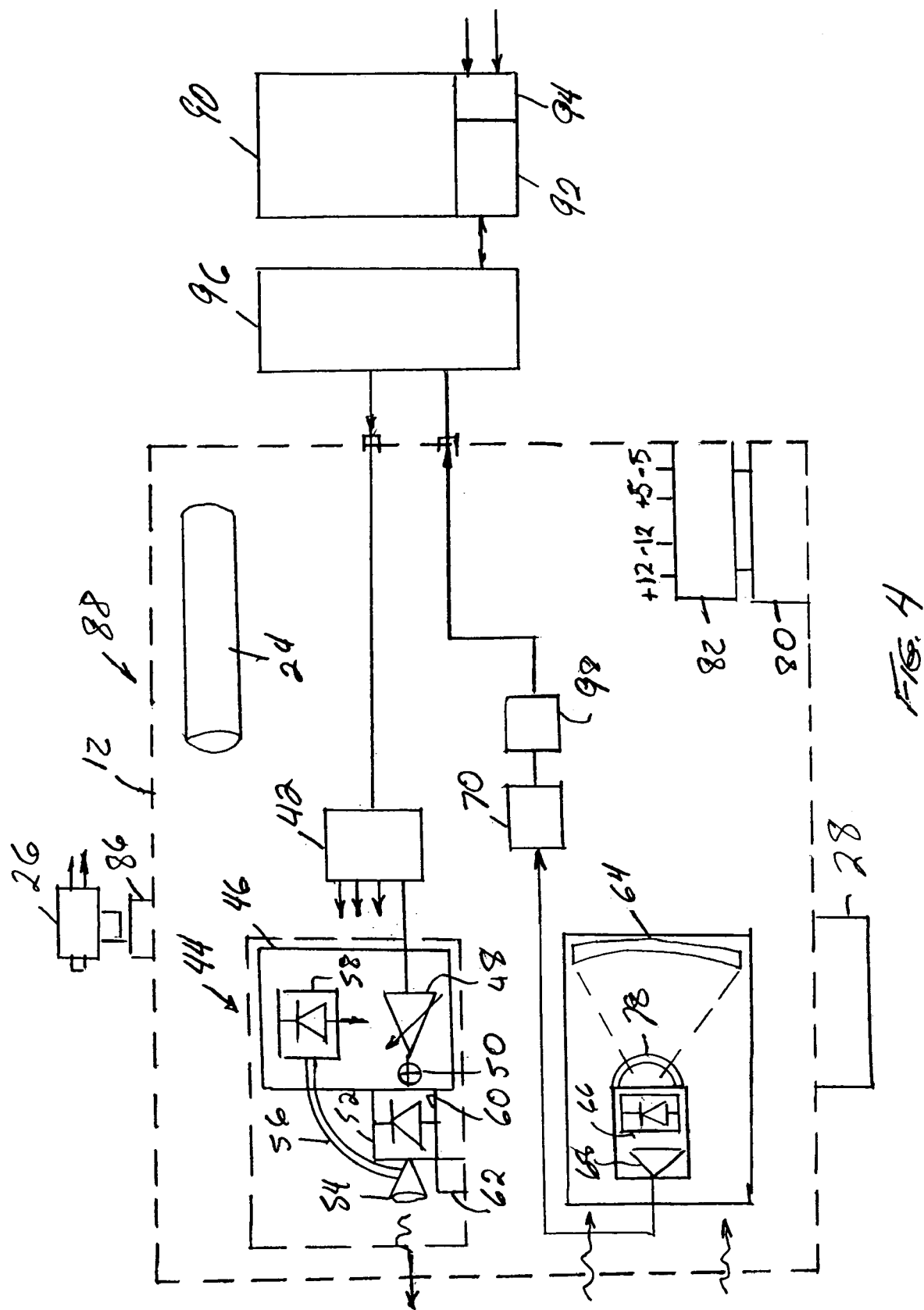
FIG. 4 is a diagram of a portable transceiver using ethernet signals.
Figure 5:
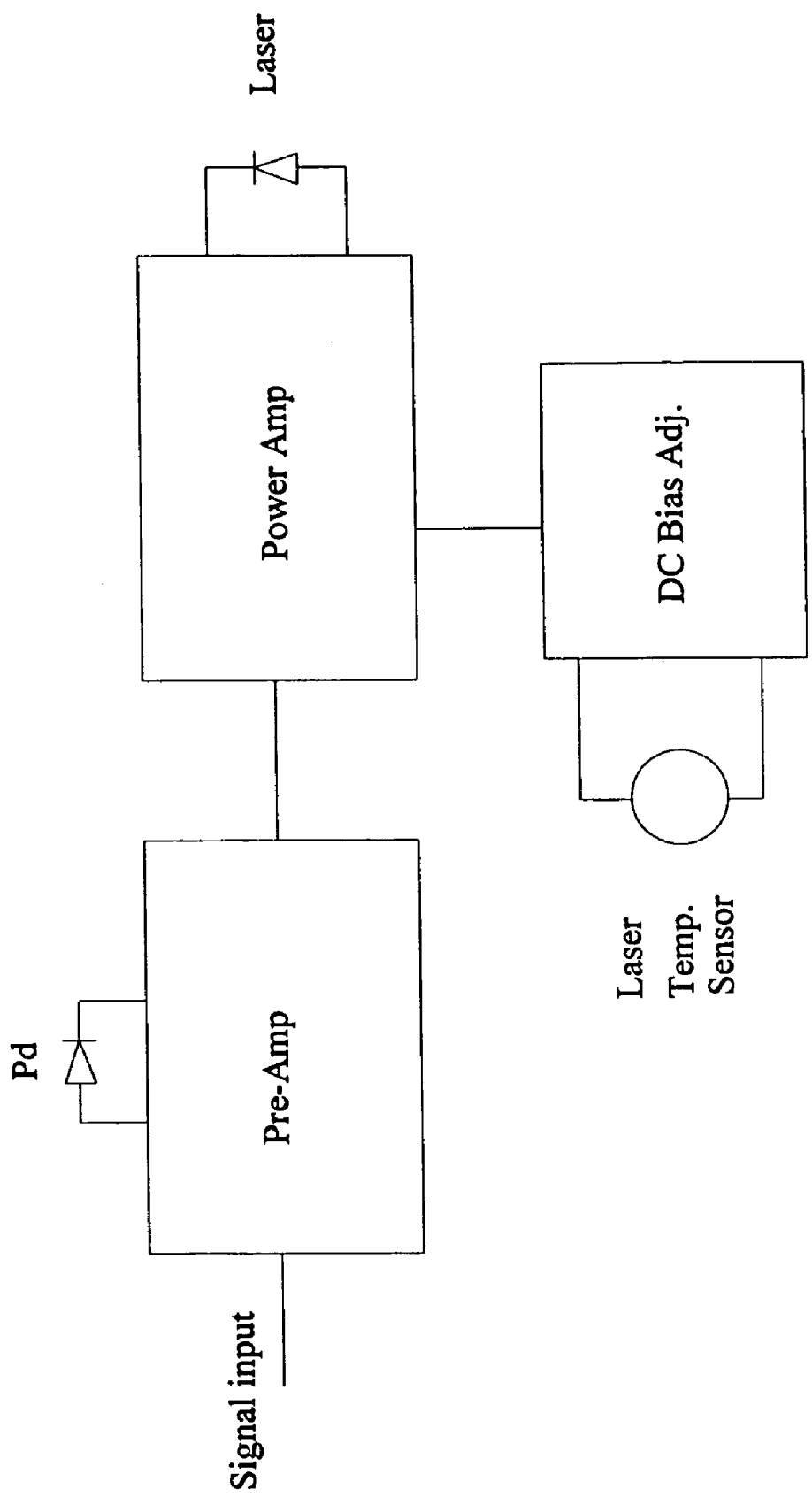
FIG. 5 is a functional diagram of a laser driver.

Accessories which may be employed with the transceiver 10 are illustrated schematically in FIGS. 3 and 4. A video/IR camera option 26 may be mounted to the housing 12. Again, the mounting may be through an accessory shoe much as employed for flash attachments on cameras. The transceiver 10 may be mounted on a tripod through the provision of a standard ¼-20 tripod mount located in the bottom of the housing (not shown). Gyro-stabilizers 28 may alternatively be attached at this location to further stabilize handheld operation.

Looking to the schematic representation of FIG. 3, a transmitter module and a receiver module are shown to be housed within the structure. Signal input is shown to be provided through an NTSC video signal connector 30. Two audio connectors 32 may provide stereo or dual monaural signals. Most any video and audio input is contemplated such as prerecorded files, microphones, video cameras and the like. Any one or more of the inputs may be used at a time.

A frequency modulator 34 is coupled with the inlets of the video connector 30 and audio connectors 32. A video subcarrier generator 36 and two audio subcarrier generators 38 and 40 are coupled with the frequency modulator to produce in a known manner a frequency modulated signal. A splitter 42 divides the modulated signal from the frequency modulator 34 into four substantially equal components containing the same signal at one-quarter of the power. Each of the four laser data signals is then transported to one of a plurality of lasers. One of the four lasers is illustrated in FIG. 3, generally designated 44. The remaining three lasers are preferably identical to the laser 44. The laser 44 is displaced from the other lasers 44 as can be observed in FIG. 1. This displacement of all of the lasers one from another enhances the reduction of scintillation. The lasers 44 displaced from one another are also aligned and facing in parallel directions.

Each laser 44 includes a laser driver coupled with the splitter 42 and conditioning the split laser data signals. The laser driver 46 includes a modulation signal amplifier 48 and a DC bias circuit 50. The DC bias circuit 50 insures operation of the laser 44 in a relatively linear range. The laser driver further includes a temperature sensor with DC bias compensation. The laser 44 further includes a laser diode 52 responding to the conditioned laser data signals to generate an intensity modulated light signal by the frequency modulated electrical subcarriers. As the laser diode 52 tends to produce a wide angle signal of about 30° cone angle, a lens 54 receives the laser output. This lens collimates the output into a beam of less than 1° cone angle. A circularizing optic which may be a cylindrical lens or prism pair would be added if the laser has a spatially elliptical output. As noted before, the lasers 44 are all aligned such that the beams conditioned by the lenses 54 are parallel. A fiber optic element 56 extends into the transmitted light signal from the laser diode 52. This element 56 is coupled with a photodiode 58. The photodiode 58 is coupled with the modulation signal amplifier 48 to use the sampled laser diode output for controlling the amplifier 48 and in turn the signal strength. Thus, the modulation signal amplifier 48 is responsive to the output of the photodiode 58 which in turn responds to the power of light received from the fiber optic element 56. A thermoelectric cooler 60 along with its controller 62 are illustrated as positioned to cool the laser diode 52. In the current preferred embodiment, this thermoelectric cooler 60 is not employed. The system employed for generating the outgoing laser signal of the transmitter presents a continues high power, one amp peak at 20 magahertz, frequency modulated sine wave to each laser 44 with a 20 megahertz bandwidth. Each laser 44 produces an average power of 80 milliwatts and has a nominal wavelength of 1,550 nanometers.

The receiver module of the transceiver 10 includes the receiving aperture 20. A Mangin mirror 64 is aligned with the aperture 20 and faces in a parallel direction with the lasers 44. The Mangin mirror 64 focuses the incoming optical beam onto a receiver. The Mangin mirror is a negative meniscus lens with a mirrored rear surface. It provides for a compact overall design as it has a short focal length. The f-number of the receiver is approximately 0.67. The combination of a lens and a mirror in one optic element allows the amount of optical aberration to be kept within acceptable limits over the entire optical field of view such that no additional optical corrector lens is necessary. The Mangin mirror optical surfaces are typically spherical, making them easier to produce.

The receiver of the beam from the Mangin mirror 64 is a detector/pre-amplifier assembly. This assembly includes a photodiode 66 which is located at the focal point of the Mangin mirror. The incoming signal from the photodiode 66 then passes through a pre-amplifier 68, an automatic gain control 70 and a frequency demodulator 72. The video subcarrier generator 36 and the audio subcarrier generators 38 and 40 are coupled with the frequency demodulator 72 to demodulate the incoming signal which is then passed through an NTSC video connector 74 and standard audio connectors 76.

To reduce background noise from ambient light and other sources, the optical path of the receiver advantageously includes an interference filter. Such an optical passband filter is centered at the nominal laser wavelength of 1,550 nanometers with a band width of 100 nanometers. The filter may be comprised of alternating layers of dielectric material deposited on a glass substrate. This construction results in a peak transmission at band center of over 65%. The filter may be located at the receiving aperture 20. However, such a position adds weight and size to the assembly. Preferably a filter 78 is located between the Mangin mirror 64 and the photodiode 66. This filter 78 is hemispherical in shape and has a center of curvature at the focal point of the Mangin mirror 64. Using a standard TO-8 size detector package results in a hemispheric filter dome having an outer diameter of approximately 22 millimeters and a thickness of 2.5 millimeters.

As noted above, the transceiver 10 is designed to be portable, consequently, batteries 80 are used with this system. Four lithium ion rechargeable batteries, each at 14 volts, have been found to have a one and one-half hour useful charge as the transceiver 10 is rated at 2.8 amp. hours. A voltage converter 82 provides +/−12 volts and +/−5 volts to the system.

The portability of the transceiver 10 also suggests certain external equipment. A standard ¼-20 tripod mount may be located on the bottom of the housing (not shown). This mount obviously receives a tripod or an optional two-axis gyro-stabilizer 28. An accessory shoe 86 located on the top of the housing 12 may accommodate a video/IR camera capable of inputting signals to the connectors 30 and 32. The connectors 30, 32, 74 and 76 accommodate microphones, speakers, video input and recording devices and the like.

FIG. 4 discloses a transceiver 88 of ethernet signals. Like numbers on the figures reflect elements having similar function. Conventional data entry and output employs a computer 90 with a network interface card 92 and a video capture card 94 for video and audio input. The network interface card 92 interfaces with a 10/100 ethernet switch 96. This switch 96 employs RJ45 connectors with a 10 Base T format. No frequency modulation is employed. However, a clock and data recovery unit 98 is needed for the digital signals.

Accordingly, improved portable transceivers using laser signals are disclosed for video and audio transmission. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A portable transceiver of one or more signals, comprising
    an input for receiving the one or more signals;
    a frequency modulator coupled with the input and modulating the one or more signals;
    a splitter coupled with the frequency modulator to divide the modulated signal into laser data signals;
    a plurality of lasers coupled with the splitter to receive the laser data signals, the lasers being displaced from one another and facing in parallel directions;
    the plurality of lasers including a laser driver coupled with the splitter and conditioning the laser data signals and laser diodes driven by the conditioned laser data signals, respectively;
    the laser driver including a modulation signal amplifier coupled with the splitter and a DC bias circuit coupled between the modulation signal amplifier and one of the laser diodes; and
    the laser driver further including a photodiode, a fiber optic element sampling the laser diode output and extending to the photodiode, the modulation signal amplifier being coupled with the photodiode and responsive to the output of the photodiode.

2. The portable transceiver of claim 1, the plurality of lasers further including lenses receiving the laser outputs, respectively, and collimating the outputs into beams of less than 1° cone angle each.

3. The portable transceiver of claim 1, the laser driver including modulation signal amplifiers coupled with the splitter and DC bias circuits coupled between the modulation signal amplifiers and the laser diodes, respectively.

4. The portable transceiver of claim 1, the laser driver generating a continuous sine wave to each laser with a 20 megahertz bandwidth.

5. The portable transceiver of claim 4, each laser diode generating an average power of 80 miliwatts.

6. The portable transceiver of claim 5, there being four laser diodes.

7. The portable transceiver of claim 1 further comprising a visual siting scope aligned with the lasers.

8. The portable transceiver of claim 1 further comprising a video subcarrier generator coupled with the frequency modulator.

9. The portable transceiver of claim 8 further comprising two audio subcarrier generators coupled with the frequency modulator.

10. A portable transceiver of one or more signals, comprising:
    an input for receiving the one or more signals;
    a frequency modulator coupled with the input and modulating the one or more signals;
    a splitter coupled with the frequency modulator to divide the modulated signal into laser data signals;
    a plurality of lasers coupled with the splitter to receive the laser data signals, the lasers being displaced from one another and facing in parallel directions;
    an aperture;
    a Mangin mirror in line with the aperture facing in a parallel direction to the lasers;
    a photodiode at the focal point of the Mangin mirror;
    a frequency demodulator in communication with the photodiode; and
    an output from the frequency demodulator.

11. The portable transceiver of claim 10 further comprising
    a preamplifier coupled with the photodiode;
    an automatic gain control coupled with the preamplifier and with the frequency demodulator.

12. The portable transceiver of claim 10 further comprising
    a hemispherical interference filter having a center of curvature at the focal point of the Mangin mirror.

13. The portable transceiver of claim 12, the hemispherical interference filter being an optical filter having a nominal center wavelength of 1550 nanometers.

14. The portable transceiver of claim 13, the hemispherical interference filter having a narrow bandwidth of 100 nanometers.

15. The portable transceiver of claim 10, the Mangin mirror having an f-number of about 0.67.

16. The portable transceiver of claim 10 further comprising
    a video subcarrier generator coupled with the frequency demodulator.

17. The portable transceiver of claim 16 further comprising
    two audio subcarrier generators coupled with the frequency demodulator.

18. A portable transceiver of one or more signals, comprising
    an aperture;
    a Mangin mirror in line with the aperture;
    a photodiode at the focal point of the Mangin mirror;
    an output from the photodiode; and
    a hemispherical interference filter having a center of curvature at the focal point of the Mangin mirror.

19. The portable transceiver of claim 18, the hemispherical interference filter being an optical filter having a nominal center wavelength of 1550 nanometers.

20. The portable transceiver of claim 19, the hemispherical interference filter having a narrow bandwidth of 100 nanometers.

21. A portable transceiver of ethernet signals, comprising
    an input for receiving one of the ethernet signals;
    a splitter coupled with the input to divide the ethernet signal into laser data signals; and
    a plurality of lasers coupled with the splitter to receive the laser data signals, the lasers being displaced from one another and facing in parallel directions;

the plurality of lasers including a laser driver coupled with the splitter and conditioning the laser data signals and laser diodes driven by the conditioned laser data signals, respectively, the laser driver including a signal amplifier coupled with the splitter and a DC bias circuit coupled between the signal amplifier and one of the laser diodes, and the laser driver further including a photodiode, a fiber optic element sampling the laser diode output and extending to the photodiode, the signal amplifier being coupled with the photodiode and responsive to the output of the photodiode.

22. The portable transceiver of claim 21, the plurality of lasers further including lenses receiving the laser outputs, respectively, and collimating the outputs into beams of less than 1° cone angle each.

23. The portable transceiver of claim 21, the laser driver including signal amplifiers coupled with the splitter and DC bias circuits coupled between the signal amplifiers and the laser diodes, respectively.

24. The portable transceiver of claim 21, there being four laser diodes.

25. The portable transceiver of claim 21 further comprising a visual siting scope aligned with the lasers.

26. A portable transceiver of ethernet signals, comprising an input for receiving one of the ethernet signals;

a splitter coupled with the input to divide the ethernet signal into laser data signals;

a plurality of lasers coupled with the splitter to receive the laser data signals, the lasers being displaced from one another and facing in parallel directions;

an aperture;

a Mangin mirror in line with the aperture facing in a parallel direction to the lasers;

a photodiode at the focal point of the Mangin mirror; and an output from the photodiode.

27. The portable transceiver of claim 26 further comprising a preamplifier coupled with the photodiode;

an automatic gain control coupled with the preamplifier and with the output.

28. The portable transceiver of claim 26 further comprising a hemispherical interference filter having a center of curvature at the focal point of the Mangin mirror.

29. The portable transceiver of claim 28, the hemispherical interference filter being an optical filter having a nominal center wavelength of 1550 nanometers.

30. The portable transceiver of claim 29, the hemispherical interference filter having a narrow bandwidth of 100 nanometers.

31. The portable transceiver of claim 26, the Mangin mirror having an f-number of about 0.67.

* * * * *